Nov. 10, 1953 E. S. CHAPMAN 2,658,937
ELECTRICAL STORAGE BATTERY
Filed July 16, 1951 4 Sheets-Sheet 1

Inventor
E. S. Chapman

Nov. 10, 1953  E. S. CHAPMAN  2,658,937
ELECTRICAL STORAGE BATTERY
Filed July 16, 1951  4 Sheets-Sheet 2

Inventor
E. S. Chapman

Nov. 10, 1953  E. S. CHAPMAN  2,658,937
ELECTRICAL STORAGE BATTERY
Filed July 16, 1951  4 Sheets-Sheet 4
Fig.4b.
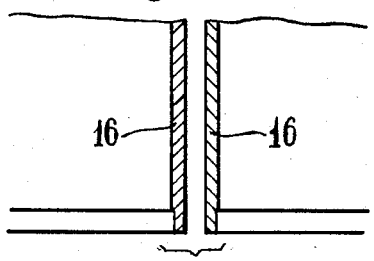
Fig.5b.
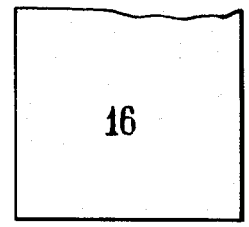
CELL LID
Fig.4A.
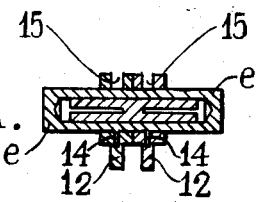
Fig.5A.
INTER-CELL CONNECTOR
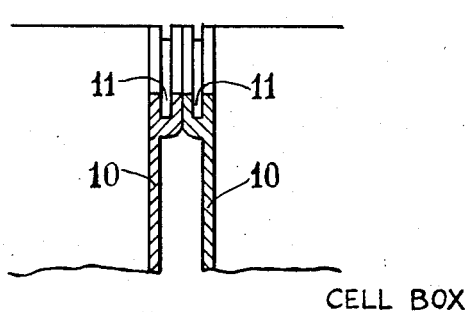
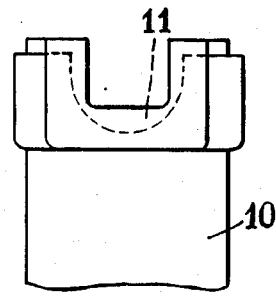
CELL BOX
Fig.4.  Fig.5.
Inventor
E. S. Chapman Patented Nov. 10, 1953

2,658,937

UNITED STATES PATENT OFFICE 2,658,937

ELECTRICAL STORAGE BATTERY

Edward Spence Chapman, Dagenham Dock, England, assignor to The Chloride Electrical Storage Company Limited, Clifton Junction, England, a British company Application July 16, 1951, Serial No. 236,967

Claims priority, application Great Britain September 25, 1950

2 Claims. (Cl. 136—134)

This invention relates to electrical storage batteries and particularly, though not exclusively, to such batteries for use in aircraft.

The invention comprises improvements in or modifications of storage batteries constructed in accordance with specification No. 188,436, now Patent No. 2,620,370.

The object of the present invention is to provide batteries the individual cells of which may readily be removed and replaced by new cells so that the battery may be retained in service with a minimum interruption.

The invention consists in an electrical storage battery as claimed in specification No. 188,436, now Patent No. 2,620,370, modified by each lead or lead alloy connecting bar of each cell being connected permanently to a plate bridge of one cell only and being furnished with an electrically connecting member by means of which connection may readily be made to or broken from a complementary electrically connecting member on a similar connecting bar of another cell.

The invention also consists in an electrical storage battery as set forth in the preceding paragraph wherein said electrically connecting members comprise sockets embedded in or partly embedded in the electrically connecting bars and adapted to co-act with connecting pins or jumpers.

The invention also consists in an electrical storage battery as set forth in either of the two preceding paragraphs, wherein insulating material covering the exterior of the electrically connecting members external to each cell is furnished with a ledge or the like to facilitate the application thereto of a cement serving to hold adjacent cells together and to prevent creepage of acid or moisture into the joint.

The invention also consists in electrical storage batteries and cells therefor substantially as hereinafter described with reference to the accompanying drawings.

Referring to the accompanying drawings.

Figure 1:
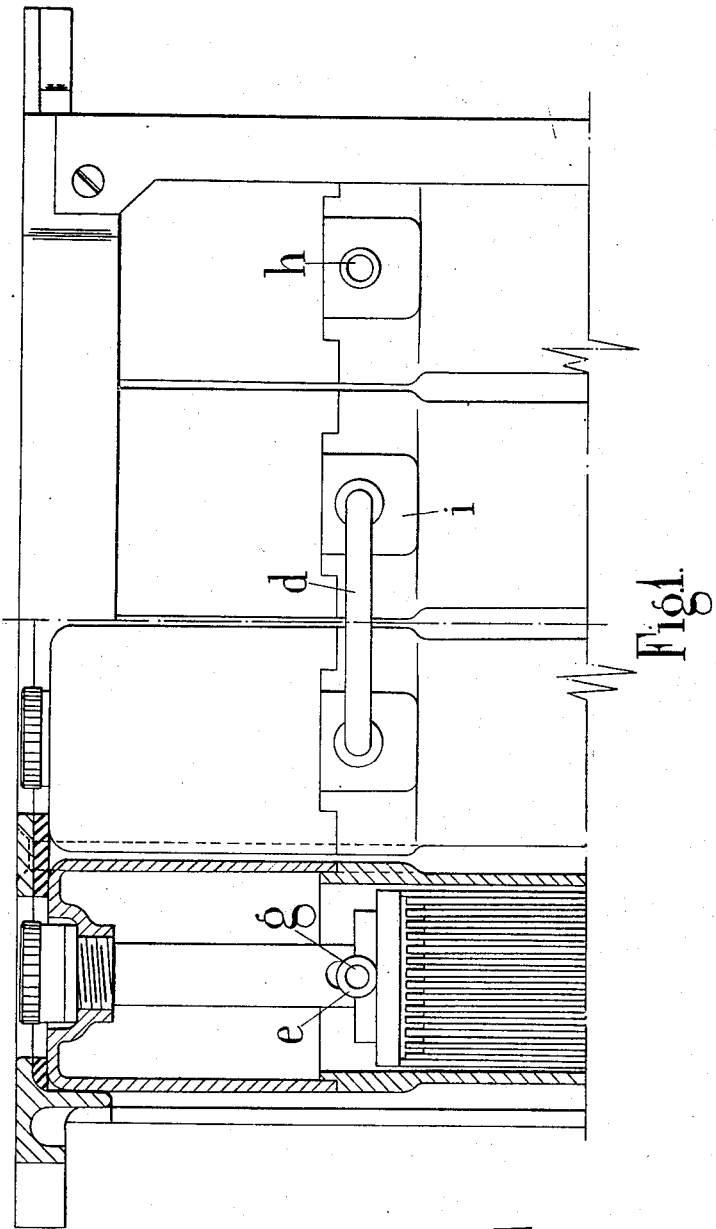
Figure 1 is a sectional front elevation of part of a battery of twelve cells embodying the present invention.
Figure 2:
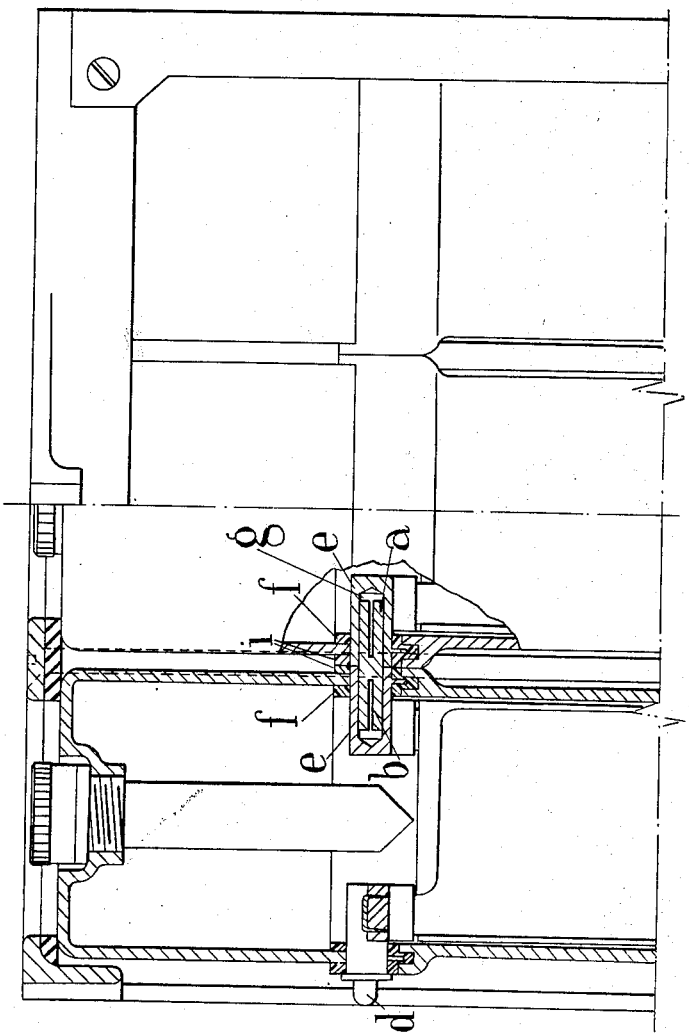
Figure 2 is a sectional end elevation thereof.
Figure 3:
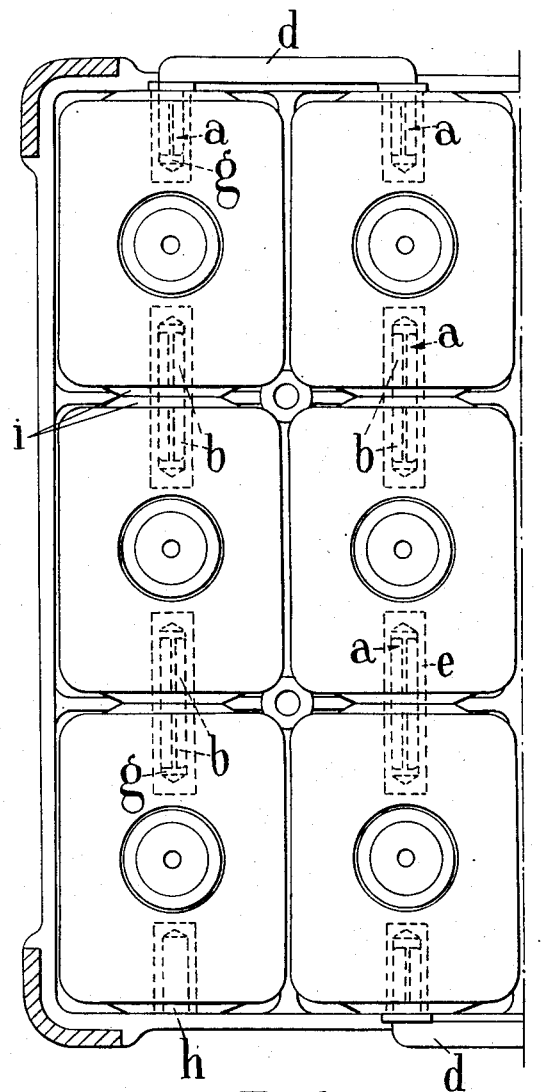
Figure 3 is a sectional plan view thereof.

Figures 4, 4ª, 4ᵇ constitute a sectional view similar to Figure 2 but showing parts of the cell lid and the cell wall with the intercell connector in position for assembling in the lid and wall.

Figures 5, 5ª, 5ᵇ constitute an end view of the parts shown in section in Figures 4, 4ª and 4ᵇ.

The cell wall 10 at the place where the inter-cell connector is to be located has an external open top pocket 11 to receive a substantially semi-cylindrical flange 12 of insulating material which is moulded upon the connecting member e which is welded or secured to the plate bridge of plates of the same polarity in the cell. The flange 12 is moulded around a flange 14 on the lower side of the member e and the insulating material of which the flange 12 is composed provides a slot 15 into which the lid 16 fits.

When the inter-cell connectors have been assembled in the cell walls 10 and welded to plate bridges in the cell, two cells are brought together with a split ended electrically conducting pin a extending between the hollow interiors of the two bars e with which such pin makes good electrical connection. The mouldings around the bars e are cemented to the cell walls or cases and the pockets and the joint at i, Figure 2, between plastic mouldings is also cemented.

The invention is a development of the invention in concurrent application Serial No. 188,436, now Patent No. 2,620,370, but utilises an improved form of external connector between adjacent cells.

Any individual cell can be removed and disconnected from the cell to which it is coupled by prizing apart the abutting faces of the open top pockets 11. After removal of a cell, a new cell is substituted, the double ended pin a, b passing into its bar e, and the joint face i is cemented.

Instead of using a single connecting pin for connecting adjacent cells, two or more pins associated with a corresponding number of sockets on each cell may be used.

I claim:

1. An electrical storage battery cell comprising a plastic case, open top pockets provided on the outsides of two opposite walls of said cell, plates with plate bridges in said cell, a hollow socket like external electrical connector for each plate bridge, a split ended pin which fits in said socket and partly projects therefrom, a plastic moulding around a part of each connector, each moulding comprising a part which enters a pocket so that the connector with moulding can be held in position by the pocket with the outer end portion of the connector free of the moulding, the inner end portion being burnt on to a plate bridge, and the moulding being cemented to the plastic case, and a cover for the case which also fits in the moulding of each connector.

2. An electrical storage battery comprising at least two cells each of which includes a plastic case, open top pockets provided on the outside of two opposite walls of each of said cases, plates with plate bridges in said cases, a hollow socket like external electrical interconnector for each cell comprising a part burnt on to a plate bridge and a plastic moulding around the interconnector, each moulding comprising a part which enters an open top pocket so that the connector with moulding is held in position by the pocket, the moulding being cemented to the plastic case, a cover for each case which also fits into a slot in the moulding of each interconnector, and a split ended pin which fits into the hollow interiors of connectors of adjacent cells and electrically connects them.

EDWARD SPENCE CHAPMAN.

References Cited in the file of this patent

UNITED STATES PATENTS

| Number | Name | Date |
|---|---|---|
| 414,953 | Roberts | Nov. 12, 1889 |
| 1,712,897 | Morrison | May 14, 1929 |
| 1,828,393 | Chilton | Oct. 20, 1931 |
| 2,066,675 | Dunzweiler | Jan. 5, 1937 |
| 2,180,959 | Hopkins | Nov. 21, 1939 |
| 2,620,370 | Chapman | Dec. 2, 1952 |

FOREIGN PATENTS

| Number | Country | Date |
|---|---|---|
| 108,849 | Great Britain | Feb. 28, 1918 |